United States Patent
Shimada et al.

(10) Patent No.: US 8,258,219 B2
(45) Date of Patent: Sep. 4, 2012

(54) COATING COMPOSITION FOR WIPER BLADE AND WIPER BLADE MANUFACTURED THEREFROM

(75) Inventors: Masahito Shimada, Incheon (KR); Sun Rye Lee, Gwangmyeong-si (KR); Chang Soo Lee, Seoul (KR)

(73) Assignee: Naotech Co., Ltd., Incheon (KR)

( * ) Notice: Subject to any disclaimer, the term of this patent is extended or adjusted under 35 U.S.C. 154(b) by 216 days.

(21) Appl. No.: 12/718,678

(22) Filed: Mar. 5, 2010

(65) Prior Publication Data

US 2010/0234489 A1   Sep. 16, 2010

(30) Foreign Application Priority Data

Mar. 10, 2009 (KR) .................. 10-2009-0020095

(51) Int. Cl.
    *C08K 5/24* (2006.01)
(52) U.S. Cl. ....................... 524/261; 523/169
(58) Field of Classification Search .................. 523/169; 524/261
    See application file for complete search history.

(56) References Cited

U.S. PATENT DOCUMENTS

2006/0293183 A1* 12/2006 Kenney et al. ............... 503/212
* cited by examiner

*Primary Examiner* — Edward Cain
(74) *Attorney, Agent, or Firm* — Sughrue Mion, PLLC

(57) ABSTRACT

Disclosed is a coating composition for a wiper blade, which includes a silicone-based wax, a silicone oil and a solid lubricant so that the silicon-based wax in a liquid phase dissolved in the silicone oil coexists with the solid lubricant for extended time periods. Also, a wiper blade is provided, which has a rib including a coating layer formed from the coating composition, so that upon operation of the wiper blade, components of the coating layer dissolve out of the surface of the coating layer and are then transferred onto a windshield due to friction between the wiper blade and the windshield, thereby forming on the surface of the windshield a water repellent film which is hard and has outstanding durability.

8 Claims, No Drawings

COATING COMPOSITION FOR WIPER BLADE AND WIPER BLADE MANUFACTURED THEREFROM

This application claims priority under 35 U.S.C. §119 from Korean Patent Application No. 10-2009-0020095, filed on Mar. 10, 2009, the entire disclosure of which is incorporated herein by reference in its entirety.

BACKGROUND OF THE INVENTION

1. Technical Field

The present invention relates to a coating composition for a wiper blade and a wiper blade manufactured therefrom. More particularly, the present invention relates to a coating composition for a wiper blade, which is necessary to ensure a clear visual field through a front windshield of a vehicle, and to a wiper blade resulting from using the same.

2. Description of the Related Art

Wiper blades play a role in wiping rain, dirt and the like attached to a front or rear windshield of a vehicle. However, in a pouring rain and the like, even when wiper blades are operated, rain may remain on the wiped portion of the windshield, so that the visual field may become very poor.

In addition, in the case where wax is attached to the front windshield due to washing using an automatic washer, diffused reflection may be caused upon night driving, undesirably deteriorating the visual field. Furthermore, an oil film may be formed, thus creating the chattering of the wiper blades, undesirably making it difficult to efficiently operate the wiper blades.

In order to solve such problems, there is exemplified a method of additionally applying a water repellent agent on the surface of a front windshield to form a water repellent film so that rain droplets scatter. However, even when the water repellent film is formed, in order to ensure a clear visual field, wiper blades should be operated to thus remove rain and dirt from the windshield. Also, when the wiper blades are operated on the surface of the windshield subjected to water repellent treatment, the water repellent film gradually peels off due to friction with the wiper blades, undesirably deteriorating the effect thereof within a short time. Furthermore, the application of the water repellent agent on the windshield is very annoying and difficult, and the water repellent treatment prevents the formation of a water film on the surface of the windshield, and undesirably the wiper blades do not efficiently operate and may chatter.

With the goal of solving problems related thereto, Korean Unexamined Patent Publication. No. 2002-0091721 and Japanese Unexamined Patent Publication No. Hei. 10-001640 disclose a technique for coating the rib of a wiper blade with a coating composition containing powder such as silicone powder, graphite, molybdenum disulphide or polytetrafluoroethylene such that friction between the front windshield and the wiper blade is reduced, thus prolonging the lifespan of a water repellent film and improving the ability to operate a wiper blade.

However, because the above technique is premised on the application of the water repellent agent on the windshield, it ultimately cannot solve the annoying and difficult problem of applying the water repellent agent on the windshield.

Hence, attempts began to be made to manufacture a wiper blade imparted with water repellency. By way of example, Japanese Unexamined Patent Publication No. 2000-16253 discloses a technique for forming a wiper blade from a silicone rubber composition containing porous particles impregnated with a silane compound or silicone oil, in which the operation of the wiper blade can form a film which is like a water repellent film resulting from using a water repellent agent. However, the wiper blade formed from silicone rubber containing silicone oil is inferior in terms of wear resistance, wiping and slipping properties, compared to when using conventional natural rubber.

By way of another example, there is disclosed a technique for manufacturing a wiper blade having a rib coated with a silicone oil-containing film, in which the operation of the wiper blade forms a film which is like a water repellent film resulting from using a water repellent agent, and this was developed, filed, and patented (Korean Patent No. 543181) by the present applicant.

However, the demand for wiper blades in which water repellency is retained for extended time periods to ensure a clear visual field and which operate efficiently continues.

SUMMARY OF THE INVENTION

Accordingly, the present invention is intended to provide a coating composition for a wiper blade, which enables the operation of the wiper blade to form a water repellent film which is like a water repellent film resulting from using a water repellent agent, without a need to additionally apply a water repellent agent to a front windshield, so that a clear visual field is ensured over extended time periods and the wiper blade operates efficiently.

Also, the present invention is intended to provide a wiper blade manufactured using the above coating composition, in which the operation of the wiper blade forms a water repellent film which is like a water repellent film resulting from using a water repellent agent, without a need to additionally apply a water repellent agent to a front windshield, so that a clear visual field is ensured over extended time periods and the wiper blade operates efficiently.

An aspect of the present invention provides a coating composition for a wiper blade, including 100 parts by weight (based on non-volatile matter content) of a binder resin with or without a curing agent, 60~1,200 parts by weight of a silicone-based wax having a melting point of 30~130° C., 60~1,200 parts by weight of a silicone-based oil, and 60~800 parts by weight of a solid lubricant.

In this aspect, the silicone-based wax may be at least one selected from the group consisting of stearyl dimethicone wax, stearoxy trimethylsiloxane wax, bis PEG-18 methyl-etherdimethylsilane wax, alkyldimethicone wax and alkylmethylsiloxane wax.

In this aspect, the silicone-based oil may have a volatile matter content of 10 wt % or less upon drying at 105° C. for 3 hours and a kinematic viscosity of 1~30,000 mm$^2$/s at 25° C.

In this aspect, the silicone-based oil may be at least one selected from the group consisting of polydimethylsiloxane, decamethylcyclopentasiloxane, methylphenylpolysiloxane, methylhydrogenpolysiloxane, amino-functional polydimethylsiloxane, octamethyltrisiloxane, decamethyltetrasiloxane, carboxyl-functional polydimethylsiloxane, carbinol-functional polydimethylsiloxane, phenol-functional polydimethylsiloxane, fluoro-functional polydimethylsiloxane, epoxy-functional polydimethylsiloxane, alkyl-functional polydimethylsiloxane, and polyether-functional polydimethylsiloxane.

In this aspect, the solid lubricant may be at least one selected from the group consisting of molybdenum disulfide (MoS$_2$), polytetrafluoroethylene (PTFE), graphite, boron nitride, silicone resin, nylon resin, and polyethylene resin.

In this aspect, the binder resin may be at least one selected from the group consisting of polyester polyol resin, polyether polyol resin, polyurethane resin, silicone-modified urethane resin, fluoro-olefinic resin, polyvinylidene difluoride resin, tetrafluoroethylene resin, hexafluoropropylene resin, vinylidene fluoride resin, epoxy resin, urethane-modified epoxy resin, silicone-modified epoxy resin; diglycidyl ether resin, silicone resin, alkyl-modified silicone resin, phenyl-modified silicone resin, fluoro-modified silicone resin, acrylic resin, acrylic polyol resin, silicone-modified acrylic resin, methylmethacrylate-butadiene copolymer, acrylonitrile-butadiene copolymer, styrene-butadiene copolymer, butadiene resin, chloroprene latex, urethane latex, and ambient setting silicone resin.

Another aspect of the present invention provides a wiper blade having a rib including a coating layer formed from the above coating composition.

In this aspect, the coating layer may have a dry thickness of 3~30 μm.

DESCRIPTION OF SPECIFIC EMBODIMENTS

Hereinafter, a detailed description will be given of the present invention.

An embodiment of the present invention provides a coating composition for a wiper blade, which is obtained by dispersing (1) a silicone-based wax for forming a water repellent film, (2) a silicone-based oil and (3) a solid lubricant, in a binder solution (with or without a curing agent, as necessary).

In the coating composition according to the present invention, the silicone-based wax for forming a water repellent film is not particularly limited, and any silicon-based wax having a melting point of 30~130° C. and preferably 60~130° C. may be used. If a silicone-based wax having a melting point lower than 30° C. is used, in the open where the atmospheric temperature increases, the coating layer may be removed from the wiper blade, or the water repellent film formed on the windshield may be broken attributable to the dissolution of the wax, making it impossible to maintain a water repellent state or deteriorating lubricating properties of water droplets. In contrast, if a silicone-based wax having a melting point higher than 130° C. is used, adhesion to a substrate may be weakened, or reaction thereof with a binder resin to form a film that exhibits water repellency may become abnormal or may deteriorate.

As such, the melting point is defined as a value measured using a melting point apparatus (FP62, available from YAMATO SCIENTIFIC CO., LTD.) according to a test method for melting point and melting range of chemical products (JIS K 0064).

Examples of the silicone-based wax which is usable within a range of satisfying the above melting point include but are not limited to stearyl dimethicone wax, stearoxy trimethylsiloxane wax, bis PEG-18 methyletherdimethylsilane wax, alkyldimethicone wax and alkylmethylsiloxane wax. Particularly useful is alkyldimethicone wax or alkylmethylsiloxane wax in terms of water repellency, durability, and compatibility with oil. Examples of the silicone-based wax which is commercialized include but are not limited to stearyl dimethicone wax exemplified by BELSIL SDM5055 (melting point 30° C., available from Wacker Chemie AG), 41M65 (melting point 30° C., available from Clariant) and 2501 Cosmetic Wax (melting point 32° C., available from Dow Corning); stearoxy trimethylsiloxane wax exemplified by Silky Wax 10 (melting point 36~56° C., available from Dow Corning) and KF-7002 (melting point 40~50° C., available from Shinetsu Chemical); bis PEG-18 methyletherdimethylsilane wax exemplified by 2501 Cosmetic Wax (melting point 30° C., available from Dow Corning); alkyldimethicone wax exemplified by W23 (melting point 39~45° C., available from Wacker Chemie AG), 41M80 (melting point 65° C., available from Clariant), and SF1642 (melting point 60~70° C., available from Momentive Performance Materials); alkylmethylsiloxane wax exemplified by 2-5088 (melting point 70° C., available from Dow Corning) and ST Wax 30 (melting point 70° C., available from Dow Corning).

The silicone-based wax is used in an amount of 60~1,200 parts by weight, and preferably 450~900 parts by weight per 100 parts by weight (based on non-volatile matter content) of a binder which will be described later with or without a curing agent. If the amount of the silicone-based wax is smaller than 60 parts by weight, it is difficult to obtain sufficient water repellency. In contrast, if the amount thereof is greater than 1,200 parts by weight, the strength of a coating layer is reduced and lubricating durability may thus deteriorate.

Also in the coating composition according to the present invention, the silicone-based oil is not particularly limited, and examples thereof may include polydimethylsiloxane, decamethylcyclopentasiloxane, methylphenylpolysiloxane, methylhydrogenpolysiloxane, amino-functional polydimethylsiloxane, octamethyltrisiloxane, decamethyltetrasiloxane, carboxyl-functional polydimethylsiloxane, carbinol-functional polydimethylsiloxane, phenol-functional polydimethylsiloxane, fluoro-functional polydimethylsiloxane, epoxy-functional polydimethylsiloxane, alkyl-functional polydimethylsiloxane and polyether-functional polydimethylsiloxane. Particularly useful is polydimethylsiloxane, methylhydrogenpolysiloxane or amino-functional polydimethylsiloxane in terms of water repellency and durability. For the sake of performance considerations, the silicone-based oil may be used alone or in combinations of two or more.

Furthermore, it is expedient that the silicone-based oil be less volatile to the extent that volatile matter content is 10 wt % or less upon drying at 105° C. for 3 hours. In that case, the volatilization of the oil may be prevented in the course of applying, drying and curing the composition, and thus the silicone-based wax may be transferred from the coating layer onto the windshield, and the oil itself may be transferred onto the windshield. As such, according to a test method for loss and residue of chemical products (JIS K 0067), volatile matter content is defined as a value measured after 1 g of oil placed in a weighing vessel as prescribed in JIS R 3503 is dried at 105° C. for 3 hours. Also, it is expedient that the silicone-based oil have a kinematic viscosity of 1~30,000 mm$^2$/s at 25° C. in terms of water repellent durability or the abilities to be easily transferred from the coating layer onto the windshield and to form a water repellent film.

The silicone-based oil responsible for the above functions is used in an amount of 60~1,200 parts by weight and preferably 450~900 parts by weight per 100 parts by weight (based on non-volatile matter content) of a binder with or without a curing agent. If the amount of the silicone-based oil is smaller than 60 parts by weight, it is difficult to obtain sufficient water repellency. In contrast, if the amount thereof is greater than 1,200 parts by weight, the strength of the coating layer is weakened and lubricating durability may thus be reduced.

Also in the coating composition according to the present invention, the solid lubricant is not particularly limited, and specific examples thereof may include molybdenum disulfide ($MoS_2$), polytetrafluoroethylene (PTFE), graphite, boron nitride, silicone resin, nylon resin, and polyethylene resin, in the form of powder. Particularly useful is graphite. Because graphite is a mineral having a laminar crystalline structure which is very soft and has good lubricating properties, it is advantageous under the conditions of wiper blades which change from a dry state to a wet state thanks to its lubricating properties not being lost even when in a state of contact with water. Hence, the solid lubricant may be composed mainly of graphite. If the solid lubricant composed mainly of graphite manifests satisfactory performance, it may be used alone or in combinations of two or more.

The solid lubricant has an average particle size of 2~15 μm and is thus expedient in terms of lubricating properties or wiping of wiper blades.

The solid lubricant is used in an amount of 30~800 parts by weight and preferably 300~500 parts by weight per 100 parts by weight (based on non-volatile matter content) of a binder with or without a curing agent. If the amount of the solid lubricant is smaller than 30 parts by weight, it is difficult to obtain lubricating properties. In contrast, if the amount thereof is greater than 800 parts by weight, the strength of a coating layer is reduced, undesirably lowering lubricating durability. In particular, when the solid lubricant composed mainly of graphite is used in a combination of two or more, it may be mixed in an amount of 60~800 parts by weight, and preferably 300~500 parts by weight per 100 parts by weight of a binder with or without a curing agent.

Also in the coating composition according to the present invention, the binder is not particularly limited, and specific examples of the binder may include, regardless of being of the oil-soluble or water-soluble type, polyester polyol resin, polyether polyol resin, polyurethane resin, silicone-modified urethane resin, fluoro-olefinic resin, polyvinylidene difluoride resin, tetrafluoroethylene resin, hexafluoropropylene resin, vinylidene fluoride resin, epoxy resin, urethane-modified epoxy resin, silicone-modified epoxy resin, diglycidyl ether resin, silicone resin, alkyl-modified silicone resin, phenyl-modified silicone resin, fluoro-modified silicone resin, acrylic resin, acrylic polyol resin, silicone-modified acrylic resin, methylmethacrylate-butadiene copolymer, acrylonitrile-butadiene copolymer, styrene-butadiene copolymer, butadiene resin, chloroprene latex, urethane latex, and ambient setting silicone resin. Particularly useful is urethane resin or silicone resin. The urethane resin is superior in terms of flexibility, adhesion and wear resistance, and the silicone resin is superior in terms of slipping properties, non-adhesion or water repellency. When the binder resin satisfies adhesion to wiper blade rubber and follow-up capability of wiper blade rubber, it may be used alone or in combinations of two or more.

In addition, a method of preparing the coating composition according to the embodiment of the present invention is not particularly limited, and may include dissolving and diluting a binder with an organic solvent such as methylethylketone, toluene, xylene, butylacetate or ethanol, or water, thus obtaining a binder solution, and then adding a mixture composed of a silicone-based wax, a silicone-based oil and a solid lubricant to the binder solution so that the mixture is dispersed in the binder solution. The solvent for dissolving and diluting the binder may be used alone or in combinations of two or more within a range that completely dissolves the binder. Also, an additive may be further added, which includes a dispersant, an antifoaming agent, a leveling agent, an emulsifier, a UV absorbent, an anti-settling agent and so on, and a filler may be further added, which includes kaolin, talc, silica, calcium carbonate, mica, titanium dioxide, alumina, silicone rubber powder, urethane rubber powder, silicone resin powder, acrylic powder and so on, as necessary.

Also, the coating composition according to the present invention as mentioned above may be further mixed with a curing agent and a curing catalyst, as necessary, after which it may be applied on the wiper blade using spraying, dipping or brush painting, and then cured at room temperature or at high temperature, thereby forming a coating layer. Examples of the curing agent may include polyisocyanate, polyamide amine, aliphatic polyamine, alicyclic diamine, tertiary amine and so on. Examples of the curing catalyst may include tin-, platinum- or titanium-based compounds, organic peroxide and the like.

In particular, the rib of the wiper blade is coated with the coating composition according to the present invention, dried and cured, thus manufacturing a wiper blade. As such, it is expedient that the coating layer have a dry thickness of 3~30 on, and preferably 7~12 μm in terms of lubricating durability or wiping of the wiper blade.

In case the coating composition is applied and then cured at high temperature, the curing conditions may be set in consideration of the curing temperature of the binder and the heat resistant temperature of the rubber material of the wiper blade, and specifically may include 50~180° C. and 10~60 min. For example, in the case where the material of the wiper blade is natural rubber, hot curing at 80° C. or less is preferable in terms of not affecting the properties of rubber. Taking into consideration the above requirements, the type of binder may be selected.

The material of the wiper blade which may be coated with the composition according to the present invention is not particularly limited, and examples thereof may include natural rubber, ethylenepropylene rubber, isopropylene rubber, styrene-butadiene rubber, chloroprene rubber, fluorine rubber, silicone rubber, and mixtures thereof. As such, it goes without saying that it is possible to perform silane primer treatment and then coating in consideration of adhesion to the coating composition depending on the type of material of the wiper blade.

In the coating layer obtained from the composition according to the embodiment of the present invention, the silicone-based wax in a liquid phase dissolved in the silicone oil coexists with the solid lubricant for extended time periods. When the wiper blade including such a coating layer is operated, the components of the coating layer dissolve out of the surface of the coating layer and are transferred onto the windshield due to friction between the wiper blade and the windshield, thereby forming a water repellent film which is hard and greatly durable on the surface of the windshield. In particular, the durability of the water repellent effect is superior to that when only silicone oil is used, and lubricating properties are further improved by the synergistic effects of the silicone-based wax and the solid lubricant, resulting in a wiper blade which operates efficiently and does not chatter.

A better understanding of the present invention may be obtained by the following examples which are set forth to illustrate, but are not to be construed as limiting the present invention.

Example 1

57.2 parts by weight of polyester polyol resin (NIPPO-LAN1100, available from Nippon Polyurethane Industry) was dissolved and diluted with a solvent mixture composed of 5,900 parts by weight of methylethylketone and 5,900 parts by weight of toluene, thus preparing a resin solution. Then, the resin solution was added with a mixture composed of 450 parts by weight of natural scaly graphite (CX-3000, available from Chuetsu Graphite Works) having an average particle size of 5 μm, 1,200 parts by weight of polydimethylsiloxane (KF96-50cs, available from Shinetsu Chemical) and 1,200 parts by weight of alkylmethylsiloxane wax (2-5088, available from Dow Corning) so that the mixture was dispersed in the resin solution, thereby preparing a coating composition.

Then, polyisocyanate (CORONATE HX, available from Nippon Polyurethane Industry) serving as a curing agent was added in an amount of 42.8 parts by weight so that the sum of the non-volatile matter content of the binder and curing agent was 100 parts by weight.

The resulting coating composition was applied on a wiper blade made of natural rubber using spraying, cured at 80° C. for 30 min, and dried, thus forming a coating layer having a dry thickness of 10 μm.

Examples 2~13

Respective coating compositions were prepared in the same manner as in Example 1, with the exception that the amounts and types of wax, oil, solid lubricant, binder and solvent were changed as shown in Table 1 below.

The units of the amounts of components shown in Table 1 are parts by weight.

The respective coating compositions were applied as in Example 1, thus obtaining wiper blades.

KF9901: methylhydrogenpolysiloxane (volatile matter content of 5 wt % upon drying at 105° C. for 3 hours, kinematic viscosity of 20 mm$^2$/s at 25° C.), available from Shinetsu Chemical L656: amino-functional polydimethylsiloxane (volatile matter content of 8 wt % upon drying at 105° C. for 3 hours, kinematic viscosity of 25 mm$^2$/s at 25° C.), available from Wacker Chemie AG Solid Lubricant CX-3000: natural scaly graphite having an average particle size of 5 μm, available from Chuetsu Graphite Works SST-4: polytetrafluoroethylene having an average particle size of 4 μm, available from Shamrock Technologies Binder NIPPOLAN1100: polyester polyol resin having a non-volatile matter content of 100 wt %, available from Nippon Polyurethane Industry KR212: hydroxyl-containing silicone resin having a non-volatile matter content of 70 wt %, available from Shinetsu Chemical Curing Agent CORONATE HX: polyisocyanate having a non-volatile matter content of 100 wt %, available from Nippon Polyurethane Industry

TABLE 1

| | | Ex. | | | | | | | | | | | |
|---|---|---|---|---|---|---|---|---|---|---|---|---|---|
| Components | | 2 | 3 | 4 | 5 | 6 | 7 | 8 | 9 | 10 | 11 | 12 | 13 |
| Wax | 2-5088 | 1200 | — | 200 | — | 450 | 450 | — | — | — | — | — | — |
| | W23 | — | 1200 | — | 600 | — | — | 900 | 60 | 150 | — | — | — |
| | BELSIL SDM5055 | — | — | — | — | — | — | — | — | — | 900 | — | — |
| | Silky Wax 10 | — | — | — | — | — | — | — | — | — | — | 60 | — |
| | 2501 Cosmetic Wax | — | — | — | — | — | — | — | — | — | — | — | 150 |
| Oil | KF96-50cs | — | — | — | — | — | — | 900 | 700 | 60 | — | 700 | 60 |
| | KF9901 | 1200 | — | 500 | 600 | — | — | — | — | — | — | — | — |
| | L656 | — | 1200 | — | — | 450 | — | — | 900 | — | — | — | 900 |
| Solid Lubricant | CX-3000 | 450 | 450 | 30 | 800 | 300 | 350 | 500 | 30 | 400 | 500 | 30 | 400 |
| | SST-4 | — | — | 30 | — | — | 100 | — | — | 400 | — | — | 400 |
| Binder | NIPPOLAN 1100 | 57.2 | 57.2 | 57.2 | 57.2 | 57.2 | 57.2 | 57.2 | 51.48 | 51.48 | 57.2 | 57.2 | 57.2 |
| | KR212 | — | — | — | — | — | — | — | 14.29 | 14.29 | — | — | — |
| Curing Agent | CORONATE HX | 42.8 | 42.8 | 42.8 | 42.8 | 42.8 | 42.8 | 42.8 | 38.52 | 38.52 | 42.8 | 38.52 | 38.52 |
| Solvent | MEK | 5900 | 5900 | 1718 | 4200 | 2600 | 3800 | 4400 | 500 | 3898 | 4400 | 500 | 3898 |
| | Toluene | 5900 | 5900 | 1718 | 4200 | 2600 | 3800 | 4400 | 500 | 3898 | 4400 | 500 | 3898 |

Silicone-Based Wax 2-5088: alkylmethylsiloxane wax, available from Dow Corning

W23: alkyldimethicone wax, available from Wacker Chemie AG

BELSIL SDM5055: stearyl dimethicone wax, available from Wacker Chemie AG

Silky Wax 10: stearoxy trimethylsiloxane wax, available from Dow Corning

2501 Cosmetic Wax: bis PEG-18 methyletherdimethylsilane wax, available from Dow Corning Silicone-Based Oil KF96-50cs: polydimethylsiloxane (volatile matter content of 0 wt % upon drying at 105° C. for 3 hours, kinematic viscosity of 50 mm$^2$/s at 25° C.), available from Shinetsu Chemical Solvent MEK: methylethylketone Comparative Example 1

57.2 parts by weight of polyester polyol resin (NIPPOLAN1100, available from Nippon Polyurethane Industry) was dissolved and diluted with a solvent mixture composed of 1,300 parts by weight of methylethylketone and 1,300 parts by weight of toluene, thus preparing a resin solution. Then, the resin solution was added with a mixture composed of 450 parts by weight of natural scaly graphite (CX-3000, available from Chuetsu Graphite Works) having an average particle size of 5 μm, 50 parts by weight of polydimethylsiloxane (KF96-50cs, available from Shinetsu Chemical) and 50 parts by weight of alkylmethylsiloxane wax (2-5088, available from Dow Corning) so that the mixture was dispersed in the resin solution, thereby preparing a coating composition.

Then, polyisocyanate (CORONATE HX, available from Nippon Polyurethane Industry) serving as a curing agent was added in an amount of 42.8 parts by weight so that the sum of the non-volatile matter content of the binder and curing agent was 100 parts by weight.

The resulting coating composition was applied on a wiper blade made of natural rubber using spraying, cured at 80° C. for 30 min, and dried, thus forming a coating layer having a dry thickness of 10 μm.

Comparative Examples 2~9

Respective coating compositions were prepared in the same manner as in Comparative Example 1, with the exception that the amounts and types of wax, oil, solid lubricant, binder and solvent were changed as shown in Table 2 below.

The units of the amounts of components shown in Table 2 are parts by weight.

The respective coating compositions were applied as in Comparative Example 1, thus obtaining wiper blades.

TABLE 2

| | | C. Ex. | | | | | | | |
|---|---|---|---|---|---|---|---|---|---|
| Components | | 2 | 3 | 4 | 5 | 6 | 7 | 8 | 9 |
| Wax | 2-5088 | 1300 | 600 | 600 | — | 600 | — | — | — |
| | W23 | — | — | — | — | — | — | — | — |
| | CERAFLOUR 961 | — | — | — | — | — | 900 | — | — |
| | 41M40 | — | — | — | — | — | — | 900 | — |
| | Paraffin wax-125 | — | — | — | — | — | — | — | 900 |
| Oil | KF96-50cs | 1300 | 600 | 600 | 600 | — | 700 | 700 | 700 |
| Solid Lubricant | CX-3000 | 450 | 20 | 900 | 450 | 450 | 500 | 500 | 500 |
| Binder | NIPPOLAN1100 | 57.2 | 57.2 | 57.2 | 57.2 | 57.2 | 57.2 | 57.2 | 57.2 |
| Curing Agent | CORONATE HX | 42.8 | 42.8 | 42.8 | 42.8 | 42.8 | 42.8 | 42.8 | 42.8 |
| Solvent | MEK | 6300 | 2640 | 4400 | 2300 | 2300 | 4400 | 2300 | 2300 |
| | Toluene | 6300 | 2640 | 4400 | 2300 | 2300 | 4400 | 2300 | 2300 |

Wax
(1) CERAFLOUR 961: polyethylene wax (melting point 135° C.), available from BYK Chemie
(2) 41M40: alkyldimethicone wax (melting point 20° C.), available from Clariant
(3) Paraffin wax-125: Paraffin wax (melting point 53° C.), available from Nippon seiro Test Example The sliding properties and initial water repellency of the wiper blades obtained in the examples and comparative examples were evaluated using the following methods. The results are shown in Table 3 below.

[Sliding Test]

Using a tester based on a tester used for evaluating the performance of wiper blades as prescribed in JIS D5710, the wiper blades obtained in the examples and comparative examples were operated in an anhydrous state, and the operating current after 15 min was measured.

On the other hand, the operating current was measured using a method the same as the one above using wiper blades made of natural rubber and having no coating layer, and was used as a control.

The sliding properties were evaluated in such a manner that the operating current of the control was set at 100 and the operating current of the wiper blades obtained in the examples and comparative examples was calculated and represented by an index.

As the index is lower, the sliding properties are evaluated to be superior.

[Water Repellency Test]

Using a tester based on a tester used for evaluating the performance of wiper blades as prescribed in JIS D5710, the wiper blades obtained in the examples and comparative examples were operated in an anhydrous state, and the contact angle of the surface of the glass of the tester after 5 min was measured. As this numerical value is increased, water repellency is evaluated to be superior. The contact angle was measured using a contact angle meter (PCA-1, available from Kyowa Interface Science).

In addition, water repellent durability of the wiper blades obtained in the examples and comparative examples was measured using the following method. The results are shown in Table 4 below.

[Water Repellent Durability Test]

Using a tester based on a tester used for evaluating the performance of wiper blades as prescribed in JIS D5710, the wiper blades obtained in the examples and comparative examples were operated for 15 min in an anhydrous state, after which the wiper blades were operated for four hundred thousand cycles in a state in which water was uniformly sprayed at 500 cc/min on the front windshield. The operating speed of the wiper blades was set at 40 cycles/min. The evaluation was carried out at intervals of fifty thousand cycles. In the case where the chattering of the wiper blades was increased and the wiper blades did not operate efficiently, the test was stopped.

Evaluation Criteria

○: water repellency of 80% or more at the sliding portion/good performance

Δ: water repellency of 50% or more at the sliding portion/slightly poor performance X: water repellency below 50% at the sliding portion/poor performance

TABLE 3

| | | Sliding (Index) | Contact Angle (°) |
|---|---|---|---|
| Ex. | 1 | 88 | 100 |
| | 2 | 88 | 102 |
| | 3 | 88 | 102 |
| | 4 | 88 | 101 |
| | 5 | 86 | 100 |
| | 6 | 88 | 100 |
| | 7 | 88 | 99 |
| | 8 | 86 | 98 |

TABLE 3-continued

|  |  | Sliding (Index) | Contact Angle (°) |
|---|---|---|---|
|  | 9 | 88 | 97 |
|  | 10 | 87 | 101 |
|  | 11 | 86 | 98 |
|  | 12 | 88 | 98 |
|  | 13 | 87 | 100 |
| C. Ex. | 1 | 93 | 60 |
|  | 2 | 91 | 96 |
|  | 3 | 96 | 94 |
|  | 4 | 91 | 95 |
|  | 5 | 92 | 92 |
|  | 6 | 93 | 58 |
|  | 7 | 97 | 92 |
|  | 8 | 93 | 93 |
|  | 9 | 96 | 92 |

TABLE 4

| Cycles |  | 50,000 | 100,000 | 150,000 | 200,000 | 250,000 | 300,000 | 350,000 | 400,000 |
|---|---|---|---|---|---|---|---|---|---|
| Ex. | 1 | ○ | ○ | ○ | ○ | ○ | ○ | ○ | ○ |
|  | 2 | ○ | ○ | ○ | ○ | ○ | ○ | ○ | ○ |
|  | 3 | ○ | ○ | ○ | ○ | ○ | ○ | ○ | ○ |
|  | 4 | ○ | ○ | ○ | ○ | ○ | ○ | ○ | ○ |
|  | 5 | ○ | ○ | ○ | ○ | ○ | ○ | ○ | ○ |
|  | 6 | ○ | ○ | ○ | ○ | ○ | ○ | ○ | ○ |
|  | 7 | ○ | ○ | ○ | ○ | ○ | ○ | ○ | ○ |
|  | 8 | ○ | ○ | ○ | ○ | ○ | ○ | ○ | ○ |
|  | 9 | ○ | ○ | ○ | ○ | ○ | ○ | ○ | ○ |
|  | 10 | ○ | ○ | ○ | ○ | ○ | ○ | ○ | ○ |
|  | 11 | ○ | ○ | ○ | ○ | ○ | ○ | ○ | ○ |
|  | 12 | ○ | ○ | ○ | ○ | ○ | ○ | ○ | ○ |
|  | 13 | ○ | ○ | ○ | ○ | ○ | ○ | ○ | ○ |
| C. Ex. | 1 | *1 | *1 | *1 | *1 | *1 | *1 | *1 | *1 |
|  | 2 | ○ | ○ | ○ | ○ | Δ | X | X | X |
|  | 3 | *2 | *2 | *2 | *2 | *2 | *2 | *2 | *2 |
|  | 4 | ○ | ○ | ○ | ○ | Δ | X | X | X |
|  | 5 | ○ | ○ | ○ | ○ | ○ | ○ | X | X |
|  | 6 | *1 | *1 | *1 | *1 | *1 | *1 | *1 | *1 |
|  | 7 | ○ | ○ | Δ | X | X | X | X | X |
|  | 8 | ○ | ○ | ○ | ○ | ○ | Δ | X | X |
|  | 9 | ○ | ○ | ○ | Δ | X | X | X | X |

*1: Test was stopped because of no initial water repellency
*2: Test was stopped because wiper blades were not operating normally due to chattering.

As described hereinbefore, the present invention provides a coating composition for a wiper blade and a wiper blade manufactured therefrom. According to the present invention, the coating composition includes a silicone-based wax for forming a film having superior lubricating properties and water repellency, a silicone-based oil which is easily transferred onto a windshield, and a solid lubricant having outstanding lubricating properties. In the case where a wiper blade at least the rib of which is coated with the coating composition is mounted, the operation of the wiper blade can automatically form a water repellent film having superior durability on a front windshield. Also, rain is easily scattered by the water repellent film thus obtaining a clear visual field. Also, strange noise and chattering of the wiper blade can be prevented, so that the wiper blade can operate efficiently and silently, thus assuring safe and fine driving.

Although the embodiments of the present invention have been disclosed for illustrative purposes, those skilled in the art will appreciate that a variety of different modifications, additions and substitutions are possible, without departing from the scope and spirit of the invention as disclosed in the accompanying claims. Accordingly, such modifications, additions and substitutions should also be understood as falling within the scope of the present invention.

What is claimed is:

1. A coating composition for a wiper blade, comprising:
   100 parts by weight, based on non-volatile matter content, of a binder resin with or without a curing agent;
   60-1,200 parts by weight of a silicone-based wax having a melting point of 30-130° C.;
   60-1,200 parts by weight of a silicone-based oil; and
   60-800 parts by weight of a solid lubricant.

2. The coating composition as set forth in claim 1, wherein the silicone-based wax is at least one selected from the group consisting of stearyl dimethicone wax, stearoxy trimethylsiloxane wax, bis PEG-18 methyletherdimethylsilane wax, alkyldimethicone wax and alkylmethylsiloxane wax.

3. The coating composition as set forth in claim 1, wherein the silicone-based oil has a volatile matter content of 10 wt % or less upon drying at 105° C. for 3 hours and a kinematic viscosity of 1-30,000 mm$^2$/s at 25° C.

4. The coating composition as set forth in claim 1 or 3, wherein the silicone-based oil is at least one selected from the group consisting of polydimethylsiloxane, decamethylcyclopentasiloxane, methylphenylpolysiloxane, methylhydrogenpolysiloxane, amino-functional polydimethylsiloxane, octamethyltrisiloxane, decamethyltetrasiloxane, carboxyl-functional polydimethylsiloxane, carbinol-functional polydimethylsiloxane, phenol-functional polydimethylsiloxane, fluoro-functional polydimethylsiloxane, epoxy-functional polydimethylsiloxane, alkyl-functional polydimethylsiloxane, and polyether-functional polydimethylsiloxane.

5. The coating composition as set forth in claim 1, wherein the solid lubricant is at least one selected from the group consisting of molybdenum disulfide (MoS$_2$), polytetrafluoroethylene, graphite, boron nitride, silicone resin, nylon resin, and polyethylene resin.

6. The coating composition as set forth in claim 1, wherein the binder resin is at least one selected from the group consisting of polyester polyol resin, polyether polyol resin, polyurethane resin, silicone-modified urethane resin, fluoro-olefinic resin, polyvinylidene difluoride resin, tetrafluoroethylene resin, hexafluoropropylene resin, vinylidene fluoride resin, epoxy resin, urethane-modified epoxy resin, silicone-modified epoxy resin, diglycidyl ether resin, silicone resin, alkyl-modified silicone resin, phenyl-modified silicone resin, fluoro-modified silicone resin, acrylic resin, acrylic polyol resin, silicone-modified acrylic resin, methylmethacrylate-butadiene copolymer, acrylonitrile-butadiene copolymer, styrene-butadiene copolymer, butadiene resin, chloroprene latex, urethane latex, and ambient setting silicone resin.

7. A wiper blade having a rib comprising a coating layer formed from the coating composition of claim 1.

8. The wiper blade as set forth in claim 7, wherein the coating layer has a dry thickness of 3-30 μm.

* * * * *